United States Patent
Fukuda

[11] Patent Number: 5,357,456
[45] Date of Patent: Oct. 18, 1994

[54] ARITHMETIC CIRCUIT

[75] Inventor: Terumi Fukuda, Kanagawa, Japan

[73] Assignee: NEC Corporation, Tokyo, Japan

[21] Appl. No.: 18,069

[22] Filed: Feb. 16, 1993

[30] Foreign Application Priority Data

Feb. 18, 1992 [JP] Japan .................. 4-029847

[51] Int. Cl.$^5$ .............................. G06F 7/50
[52] U.S. Cl. .............................. 364/784
[58] Field of Search ............... 364/768, 784, 785, 786, 364/787

[56] References Cited

U.S. PATENT DOCUMENTS

| | | | |
|---|---|---|---|
| 4,425,623 | 1/1984 | Russell | 364/786 |
| 4,802,112 | 1/1989 | Yoshida et al. | 364/784 |
| 4,866,658 | 9/1989 | Mazin et al. | 364/784 |
| 4,931,981 | 6/1990 | Knauer | 364/784 |
| 4,970,677 | 11/1990 | Young | 364/784 |

Primary Examiner—Long T. Nguyen
Assistant Examiner—Chuong D. Ngo
Attorney, Agent, or Firm—Whitham, Curtis, Whitham & McGinn

[57] ABSTRACT

An arithmetic circuit for addition or subtraction includes a carry or borrow signal control section which includes a transfer gate having N-ch and P-ch transistors for transferring an input carry- or borrow-in as an output carry- or borrow-out. A signal transmission line is coupled to a source line or the earth during a sampling period and precharged during a precharge period, so that both a higher speed transmission of a carry or borrow signal and a reliable carry- or borrow-out signal can be obtained.

10 Claims, 6 Drawing Sheets

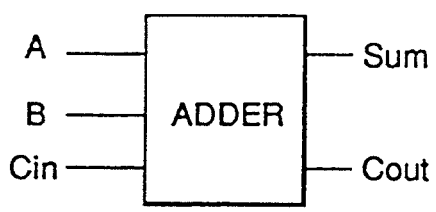
A : ADDEND
B : AUGEND
Cin : CARRY - IN
Sum : SUM
Cout : OUTPUT CARRY - OUT
FIG. 2
*PRIOR ART*
| INPUT | | | OUTPUT | | CASE-GROUP |
|---|---|---|---|---|---|
| A | B | Cin | Sum | Cout | |
| 0 | 0 | 0 | 0 | 0 | (a) |
| 0 | 0 | 1 | 1 | 0 | |
| 0 | 1 | 0 | 1 | 0 | (b) |
| 0 | 1 | 1 | 0 | 1 | |
| 1 | 0 | 0 | 1 | 0 | |
| 1 | 0 | 1 | 0 | 1 | |
| 1 | 1 | 0 | 0 | 1 | (c) |
| 1 | 1 | 1 | 1 | 1 | |
FIG. 3
*PRIOR ART*
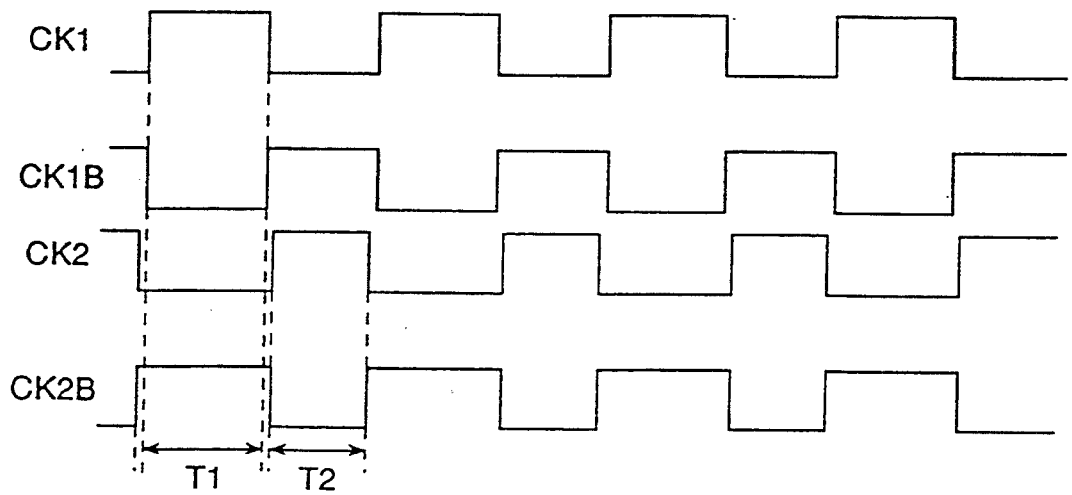
FIG. 4
*PRIOR ART*

| INPUT | | | OUTPUT | | CASE-GROUP |
|---|---|---|---|---|---|
| A | B | Bin | Sub | Bout | |
| 1 | 0 | 0 | 1 | 0 | (d) |
| 1 | 0 | 1 | 0 | 0 | |
| 0 | 0 | 0 | 0 | 0 | (e) |
| 0 | 0 | 1 | 1 | 1 | |
| 1 | 1 | 0 | 0 | 0 | |
| 1 | 1 | 1 | 1 | 1 | |
| 0 | 1 | 0 | 1 | 1 | (f) |
| 0 | 1 | 1 | 0 | 1 | |

A : MINUEND
B : SUBTRAHEND
Bin : BORROW - IN
Sub : REMAINDER
Bout : OUTPUT BORROW - OUT

FIG. 9

ARITHMETIC CIRCUIT

BACKGROUND OF THE INVENTION (a) Field of the Invention

The present invention relates to an arithmetic circuit, and more particularly to an arithmetic circuit having a function for transferring a carry or a borrow and adapted for use in an arithmetic and logic unit.

(b) Description of the Related Art

When a computation for binary operands of more than two bits is to be performed, a plurality of adding or subtracting circuits are used for the computation. With a plurality of adding or subtracting circuits (referred to as a arithmetic circuits hereinafter), a dynamic transmission circuit is generally used for transmitting a carry signal or borrow signal from a lower order position circuit to an adjacent higher order position circuit.

As for the arithmetic circuit having a dynamic transmission circuit, there is an advantage in which the configuration of the arithmetic circuit is much more simple than that of an arithmetic circuit of another type having a static circuit, and hence can operate in a higher speed. However, the dynamic transmission circuit has a drawback in which it is susceptible to noise, since the dynamic transmission circuit holds a data by storing electric charge across a parasitic capacitance thereof. The noise affecting the operation of the dynamic transmission circuit includes among others a noise caused by a cross-talk between the dynamic transmission circuit and other signal lines.

SUMMARY OF THE INVENTION

An object of the present invention is to provide an arithmetic circuit having substantially as simple a configuration as that of the conventional arithmetic circuit having a dynamic transmission circuit and less susceptible to noise than the conventional arithmetic circuit.

Another object of the present invention is to provide an arithmetic circuit in which voltage drop in the transmission circuit is substantially eliminated during transferring a carry or borrow signal for avoiding an error signal transmission.

According to the present invention, there is provided an arithmetic circuit generating a sum signal and a carry-out signal each of a one-bit binary data comprising: an input member for inputting first and second operands and a carry-in signal, each of the first and second operands and carry-in signal being a one-bit binary data; a first input-level detecting section for outputting a first active signal during a first period at a first node when both the first and second operands are 1; a second input-level detecting section for outputting a second active signal during the first period at a second node when the first operand is 1 and the second operand is 0; a precharge section for precharging the first and second nodes during a second period occurring alternately with the first period; adding means for generating a sum of the first operand and second operand and carry-in signal and outputting the sum as the sum signal; and a carry signal control section having first switching means for setting the carry-out signal at 1 responsive to the first active signal, a transfer gate for transferring the carry-in signal as the carry-out signal responsive to the second active signal, and second switching means for setting the carry-out signal at 0 responsive to absence of the first and second active signals during the first period.

Further, according to the present invention, there is provided an arithmetic circuit for outputting a remainder signal and a borrow-out signal each of a one-bit binary data comprising: an input member for inputting a minuend, a subtrahend and a borrow-in signal, each of the minuend, subtrahend and borrow-in signal being a one-bit binary data; a first input-level detecting section for outputting a first active signal during a first period at a first node when the minuend is 0 and the subtrahend is 1; a second input-level detecting section for outputting a second active signal during the first period at a second node when the minuend is equal to the subtrahend; a precharge section for precharging the first and second nodes during a second period occurring alternately with the first period; subtracting means for generating a remainder by subtraction of said subtrahend and said borrow-in signal from said minuend and outputting the remainder as the remainder signal; and a carry signal control section having first switching means for setting the borrow-out signal at 1 responsive to the first active signal, a transfer gate for transferring the borrow-in signal as the borrow-out signal responsive to the second active signal, and second switching means for setting the borrow-out signal at 0 responsive to absence of the first and second active signal during the first period.

According to the arithmetic circuit of the present invention, an input carry-in or borrow-in signal is transferred as an output carry-out or borrow-out signal in the case where the output of the second input-level detecting signal is active, and in other cases, the carry- or borrow-out signal is set by the first and the second switching means during the first period, so that the arithmetic circuit according to the present invention is less susceptible to noise than a conventional arithmetic circuit having a dynamic transmission circuit. Additionally, the speed in transmission of the carry or borrow signal is substantially the same as that of the conventional arithmetic circuit having a dynamic transmission circuit.

BRIEF DESCRIPTION OF THE DRAWINGS

Other and further objects, features and advantages of the present invention will be more apparent from the following description, referring to the accompanying drawings in which:

FIG. 2 is a block diagram of the adder of FIG. 1 in a more simple representation for clearly showing the inputs and outputs for the computation;

FIG. 3 is a truth table for the adder of FIG. 2;

FIG. 4 is a timing chart for showing clock signals used in the arithmetic circuit of FIG. 1;

FIG. 9 is a truth table for the subtracter of FIG. 8.

DESCRIPTION OF THE PREFERRED EMBODIMENTS

Before description of embodiments of the present invention, the problems in a conventional arithmetic circuit having a dynamic transmission circuit will be first described for the sake of understanding.

Figure 1:
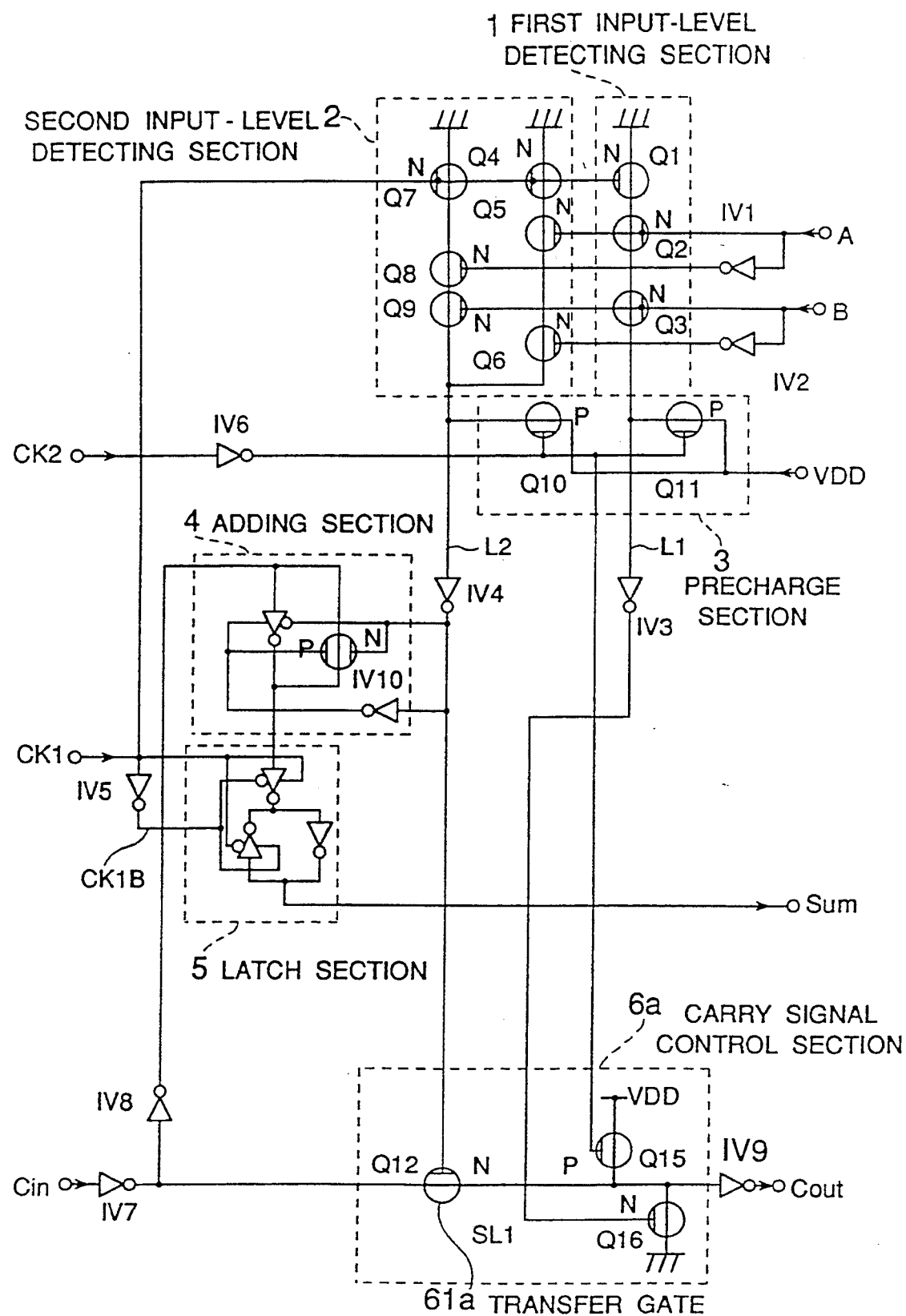
FIG. 1 is a circuit diagram of an adder as an example of a conventional arithmetic circuit having a dynamic transmission circuit for transmission of a carry signal.

FIG. 1 shows a conventional adder as an example of an arithmetic circuit having a dynamic transmission circuit (referred to as also a carry signal control section hereinafter) for outputting a carry-out signal generated in the addition. Inputs A and B are signals of an addend and an augend, respectively, while an input Cin is an input carry-in signal, and an output Cout is an output carry-out signal, each of the input and output signals being a binary 1-bit data. The arithmetic circuit comprises a first input-level detecting section 1; a second input-level detecting section 2; a precharge section 3; an adding section 4 and a latch section 5, the adding and latch sections 4 and 5 performing an addition of the operand A and the operand B and the carry-in signal Cin and outputting the sum as the sum signal Sum; and a carry signal control section 6a for outputting a carry-out signal Cout to an adjacent higher order position adder.

The first input-level detecting section 1 comprises three N-ch transistors Q1, Q2, Q3 connected in series or in a stacked configuration for discharging or holding electric charge at the output line L1 of the first input-level detecting section 1. The second input-level detecting section 2 comprises two lines connected in parallel each including three stacked N-ch transistors Q4, Q5, Q6; Q7, Q8, Q9 for discharging or holding electric charge at the output line L2 of the second input-level detecting section 2. The precharge section 3 comprises two P-ch transistors Q10 and Q11 each for precharging one of the lines L1 and L2 during a precharge period.

The carry signal control section 6a comprises a transfer gate 61a constituted by an N-ch transistor Q12 for transferring the level of the inverted input carry-in signal Cin through a dynamic signal line SL1 to the output of the carry signal control section 6a, a P-ch transistor Q15 for precharging the dynamic signal line SL1 during a precharge period, and an N-ch transistor Q16 for discharging the dynamic signal line SL1 during a sampling period. The output of the carry signal control section 6a is inverted in an inverter IV9, the output of which is outputted as an output carry-out signal Cout.

Before description of the operation of the arithmetic circuit of FIG. 1, the operational principle of a typical arithmetic circuit including the adder of FIG. 1 will be described with reference to FIGS. 2 and 3. FIG. 2 shows the adder of FIG. 1 in a more simple representation for clearly showing its input and output signals, while FIG. 3 shows a truth table for the input and output signals of the adder of FIG. 2.

Generally, the adder becomes operational when addend A, an augend B, and a carry-in Cin are inputted to the adder, and outputs the sum of the inputs as a sum signal Sum and a carry signal generated by the addition as a carry-out Cout to be transferred to an adjacent higher order position adder. The truth table of FIG. 3 lists all of the eight different cases for the different inputs A, B and Cin, among which there are four cases where a carry output is generated, namely Cout is equal to 1. Two of the four cases are listed in Case-group (c) in which both the operands A and B are 1, while the remaining two cases are listed in Case-group (b) including four cases in which the operands A and B have different values from each other and therefore the output carry-out Cout is equal to the input carry-in Cin. Namely, in Case-group (b) including the latter two cases, the input carry-in Cin is outputted or passed as the output carry-out Cout. In contrast, the carry-out Cout is always equal to 1 in Case-group (c) irrespectively of whether the carry-in Cin is 1 or 0, as described above.

Back to FIG. 1, the clock signals used in the arithmetic circuit include clock signals CK1, CK2, and inverted clock signals CK1B and CK2B. FIG. 4 is a timing chart showing the clock signals CK1, CK2, CK1B and CK2B. As seen from FIG. 4, The clock signals CK1 and CK2 rise and fall alternately and are approximately complement to each other. Each of the clock pulses of the clock signal CK1 has a pulse duration T1 while each of the clock pulses of the clock signal CK2 has a pulse duration T2. When the clock signal CK1 is at a high level, the arithmetic circuit of FIG. 1 is in a sampling period, while, when the clock signal CK2 is at a high level, the arithmetic circuit is in a precharge period.

Now, in this text, signal bit 1 is arbitrarily assumed as a high level signal at the potential of the electric source VDD, while signal bit 0 is assumed as a low level signal at the earth potential, hereinafter.

Operation of the arithmetic circuit of FIG. 1 will be described during the sampling period when the clock signal CK1 is at a high level, unless otherwise described.

Firstly, the following description of the operation will be made in the case where both the operands A and B are at a high level, namely "1". In this case, the stacked three transistors Q1, Q2, Q3 of the first input-level detecting section 1 are on, hence the output line L1 of the first input-level detecting section 1 is at a low level (0 level). The output of the first input-level detecting section 1 is inverted in an inverter IV3, then supplied to the gate of the N-ch transistor Q16 in the carry signal control section 6a thereby turning on the transistor Q16. Hence, the output carry-out Cout becomes a high level. Such a case is grouped in Case-group (c) of the truth table of FIG. 3.

Secondly, operation in the case where the inputs A and B are different from each other will be described. When one of the operands A and B is 1 and the other is 0, the output line L2 of the second input-level detecting section 2 is coupled to the earth through either one of the two parallel lines each including three stacked transistors Q4, Q5, Q6 or Q7, Q8, Q9, hence the line L2 becomes a low level. With the output lines L1 and L2 of both the input-level detecting sections 1 and 2, each of the lines L1 and L2 is at an operating level, i.e. a level to be transmitted as an output signal of each of the first and second input-level detecting sections 1 and 2 when the clock signal CK1 is at a high level. In cases other than the case where the clock signal CK1 is at a high level, the arithmetic circuit of FIG. 1 is in a precharge period and the lines L1 and L2 are precharged to a high level by the transistors Q10 and Q11 of the precharge section 3. The lines L1 and L2 are held at their operating level during the sampling period.

The adding section 4 operates for adding the sum of the input operands A and B to the carry-in Cin inputted from an adjacent lower order position adder. The output of the adding section 4 is latched by the latch section 5 during the sampling period when the clock signal CK1 is at a high level, then held and outputted as an output sum signal Sum during the precharge period when the clock signal CK2 is at a high level.

The carry signal control section 6a functions for transferring an input carry signal or for controlling the level of the output carry signal. As is already stated with reference to FIG. 3, when the inputs A and B are at the different levels, input carry-in Cin is transferred as an output carry-out Cout. In this case, the output of the second input-level detecting section 2, which is at a low level, is supplied through the inverter IV4 to the gate of the N-ch transistor Q12 constituting the transfer gate 61a of the carry signal control section 6, thereby turning on the transfer gate 61a. Thus, the level of the input carry-in Cin is transferred, as it is, to the adjacent higher order position adder as an output carry-out Cout.

In cases other than the case where the inputs A and B are at different levels (i.e. in case where the input A is equal to the input B), since the output of the second input-level detecting section 2 remains at a high level which is set during the precharge period, the transfer gate 61a is in an off state, hence the input carry-in Cin is not transferred as a carry-out Cout. In this case, the level of the output carry-out Cout is determined by the state of the discharge transistor Q16 controlled by the output of the first input-level detecting section 1.

The precharge transistor Q15 of the carry signal control section 6a is turned on during the precharge period when the clock signal CK2 is at a high level, thereby charging the dynamic signal line SL1 up to a high level to set the Cout at a low level. The parasitic capacitance of the dynamic signal line SL1 is charged with electric charge in the precharge period, which electric charge can hold the output Cout at the low level during a certain time interval after the transistor Q15 is cut off due to the low level of the clock signal CK2. Namely, a dynamic function is obtained from this configuration.

The function of the carry signal control section 6a as described above is summarized as follows:
(1) When the input carry is to be transferred (when the output of the second input-level detecting section 2 is at an active level or low level), the level of the input carry-in Cin is transmitted as an output carry-out Cout.
(2) When the input carry is not to be transferred (when the output of the second input-level detecting section 2 is at an inactive level or high level), the dynamic configuration holds the output carry-out Cout at a low level (namely, no carry is generated) except that the output carry-out Cout becomes a high level (namely, a carry is generated) only when the output of the first input-level detecting section 1 is at an active level or low level.

Figure 5:
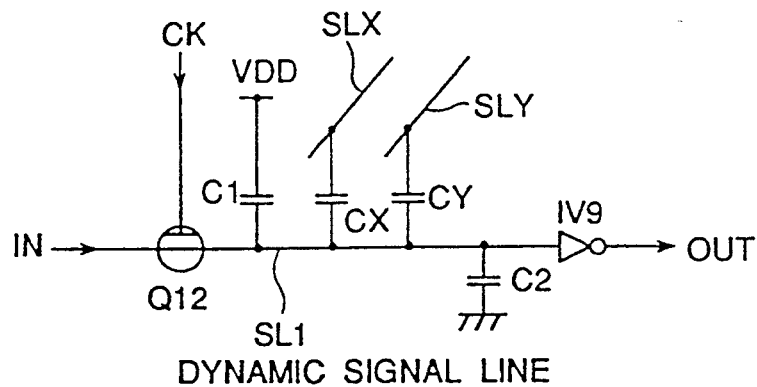
FIG. 5 is a circuit diagram of a portion of the dynamic transmission circuit for showing a problem in the arithmetic circuit of FIG. 1.
Figure 6:
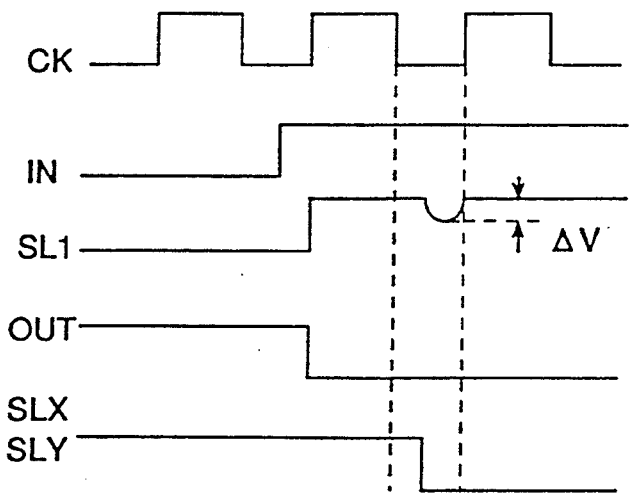
FIG. 6 is a timing chart of signals in the circuit of FIG. 5.

Now, the drawback of the conventional arithmetic circuit of FIG. 1 in which cross-talks are generated between the dynamic signal line and other signal lines will be described with reference to FIGS. 5 and 6. FIG. 5 shows a portion of the carry signal control section 6a including the dynamic signal line SL1 and two other signal lines SLX and SLY as examples extending outside the carry signal control section 6a and over the dynamic signal line SL1. The dynamic signal line SL1 has parasitic capacitances C1, C2, CX and CY between the dynamic signal line SL1 and source VDD, the earth, and signal lines SLX and SLY, respectively, as shown in FIG. 5. The other signal lines SLX and SLY are set at a high level or a low level independently of the dynamic signal line SL1. FIG. 6 shows an example of a timing chart for the signals in each of the signal lines in FIG. 5.

When the dynamic signal line SL1 is shifted from a low level to a high level, since the other signal lines SX and SY are at a high level, interference between the dynamic signal line SL1 and the other signal lines SLX and SLY is not generated. However, when the other signal lines SLX and SLY are shifted from the high level to a low level during the period when the dynamic signal line SL1 is at the high level, the potential level of the dynamic signal line SL1 is reduced by $\Delta V$ due to the parasitic capacitances CX and CY as shown in FIG. 6. Similarly, when the other signal lines SLX and SLY are shifted from a low level to a high level during a low level of the dynamic signal line SL1, the potential level of the dynamic signal line SL1 is raised by $\Delta V$. The value $\Delta V$ caused by the cross-talk can be expressed as follows:

$$\Delta V = VDD \cdot (CX+CY)/(C1+C2+CX+CY).$$

When the parasitic capacitances CX and CY are large in value, $\Delta V$ is also large, so that an error in a carry signal may be transferred to the adjacent higher order position adder.

Additionally, there is a drawback in the conventional carry signal control section 6 in which the signal level of the input of the transfer gate 61a falls by the threshold voltage of the transistor Q12 when the input signal passes through the transfer gate 61a. The fall of the potential in the dynamic signal line SL1 raises the possibility of an error signal transmission.

Now, an adder as an arithmetic circuit according to an embodiment of the present invention will be described with reference to FIG. 7. Each of the configurations of first and a second input-level detecting sections 1 and 2, a precharge section 3, an adding section 4 and a latch section 5 of the embodiment is the same as that of the respective section of the conventional arithmetic circuit of FIG. 1, so that the description of their configuration is not made here for avoiding a duplication.

Figure 7:
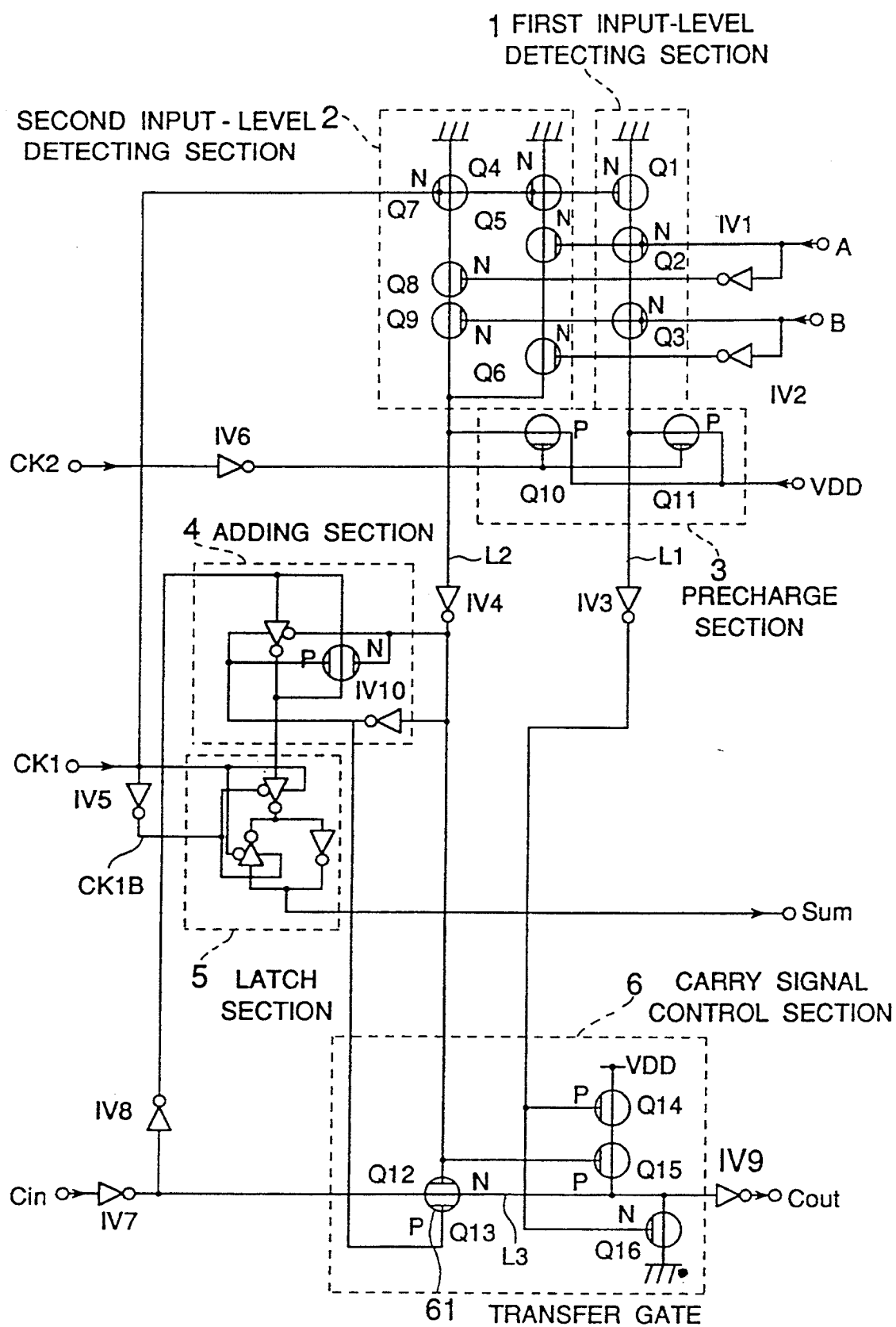
FIG. 7 is a circuit diagram of an adder as an arithmetic circuit according to an embodiment of the present invention.

The carry signal control section 6 of FIG. 7 comprises: a transfer gate 61 including an N-ch transistor Q12 and a P-ch transistor Q13; P-ch transistors Q14 and Q15 connected in series between the source VDD and a signal transmission line L3; and an N-ch transistor Q16 connected between the signal transmission line L3 and the earth. The signal transmission line L3 is connected to an inverter IV9, the output Cout of which is supplied to an adjacent order position adder.

The output of the second input-level detecting section 2 is supplied to the gate of the N-ch transistor Q12 of the transfer gate 61 through an inverter IV4, and to the gate of the P-ch transistor Q13 through the inverter IV4 and an inverter IV10. Hence, the transfer gate 61 is turned on for transferring the input carry-in Cin as the output carry-out Cout in a high speed when the output of the second input-level detecting section 2 is at an active level or low level.

The gate of the P-ch transistor Q14 is supplied with the output of the first input-level detecting section 1 through an inverter IV3, so that the P-ch transistor Q14 is turned on when the output of the first input-level detecting section 1 is at an inactive level or high level. The gate of the P-ch transistor Q15 is supplied with the output of the second input-level detecting section 2 through the inverter IV4, so that the P-ch transistor Q15 is turned on when the output of the second input-level detecting section 2 is at an inactive level. Hence, the transistors Q14 and Q15 couple the signal line L3 to the source VDD for setting the output carry-out Cout at a low level when the outputs of both the first and second input-level detecting sections 1 and 2 are at an inactive level. The N-ch transistor Q16 is supplied with the output of the first input-level detecting section 1 through the inverter IV3, so that the N-ch transistor Q16 is turned on for coupling the signal line L3 to the earth thereby setting the output carry-out Cout at a high level when the output of the first input-level detecting section 1 is at an active level.

In the embodiment Of FIG. 7, since the transfer gate 61 is constituted by the N-ch and P-ch transistors Q12 and Q13 connected in parallel, the input carry-in Cin is transferred through the transfer gate 61 substantially without a voltage drop. With the conventional carry signal control section, the high level of the input carry-in signal Cin is dropped by a threshold voltage of the N-ch transistor, for example, from a 5 V level to a 4 V level. When a low voltage power source, for example, 3 V source, is particularly adopted in the arithmetic circuit, the voltage drop which may be from a 3 V level to a 2 V level or less in the carry signal may cause an error signal in the output carry-out Cout. In contrast, the arithmetic circuit according to the embodiment can be used at a low voltage without transmission of an error signal, since a voltage drop can be substantially avoided by the configuration of the transfer gate 61 including the P-ch and the N-ch transistors.

Next, the operation of the P-ch transistors Q14 and Q15 will be described. When the output of the second input-level detecting section 2 is at a high level or inactive level, namely when the input carry-in Cin is not to be transferred as the output carry-out Cout, the P-ch transistor Q15 is turned on. In this case, if the output of the first input-level detecting section 1 is at a high level or inactive level, the P-ch transistor Q14 is also turned on thereby setting the signal transmission line L3 at a high level during the sampling period, thereby setting the output carry-out Cout at a low level. Thus, a carry is not generated in the output carry-out signal. When either one of the output of both the input-level detecting section 1 and 2 is at an active level (both are not at an active level at a time), one of the P-ch transistors Q14 and Q15 is turned off, so that the P-ch transistors Q14 and Q15 do not affect output carry-out signal Cout determined by the on-off operation of the transfer gate 61 or the N-ch transistor Q16.

As described above, the carry signal control section operates during the sampling period in such a way that: when the output of the first input-level detecting section 1 is at an active level, the N-ch transistor Q16 is turned on thereby setting the output carry-out signal Cout at a high level or a "1" level; when the output of the second input-level detecting section 2 is at an active level, the transfer gate 61 is turned on thereby transferring the input carry-in signal Cin as an output carry-out signal Cout; and when both the outputs of the first and the second input-level detecting sections 1 and 2 are at an inactive level, the P-ch transistors Q14 and Q15 are turned on thereby setting the output carry-out Cout at a "0" level. Hence, the arithmetic circuit of the embodiment is less susceptible than the conventional arithmetic circuit having a dynamic transmission circuit in which output carry-out Cout is kept at a "0" level by holding the electric charge stored on the dynamic signal line during the precharge period. Additionally, the P-ch transistor Q14 or Q15 operates simultaneously with the transfer gate 61 or the N-ch transistor Q16 in reverse direction, the speed of the transmission of the carry signal in FIG. 7 is substantially the same as that of the dynamic transmission line of FIG. 1.

Figure 8:
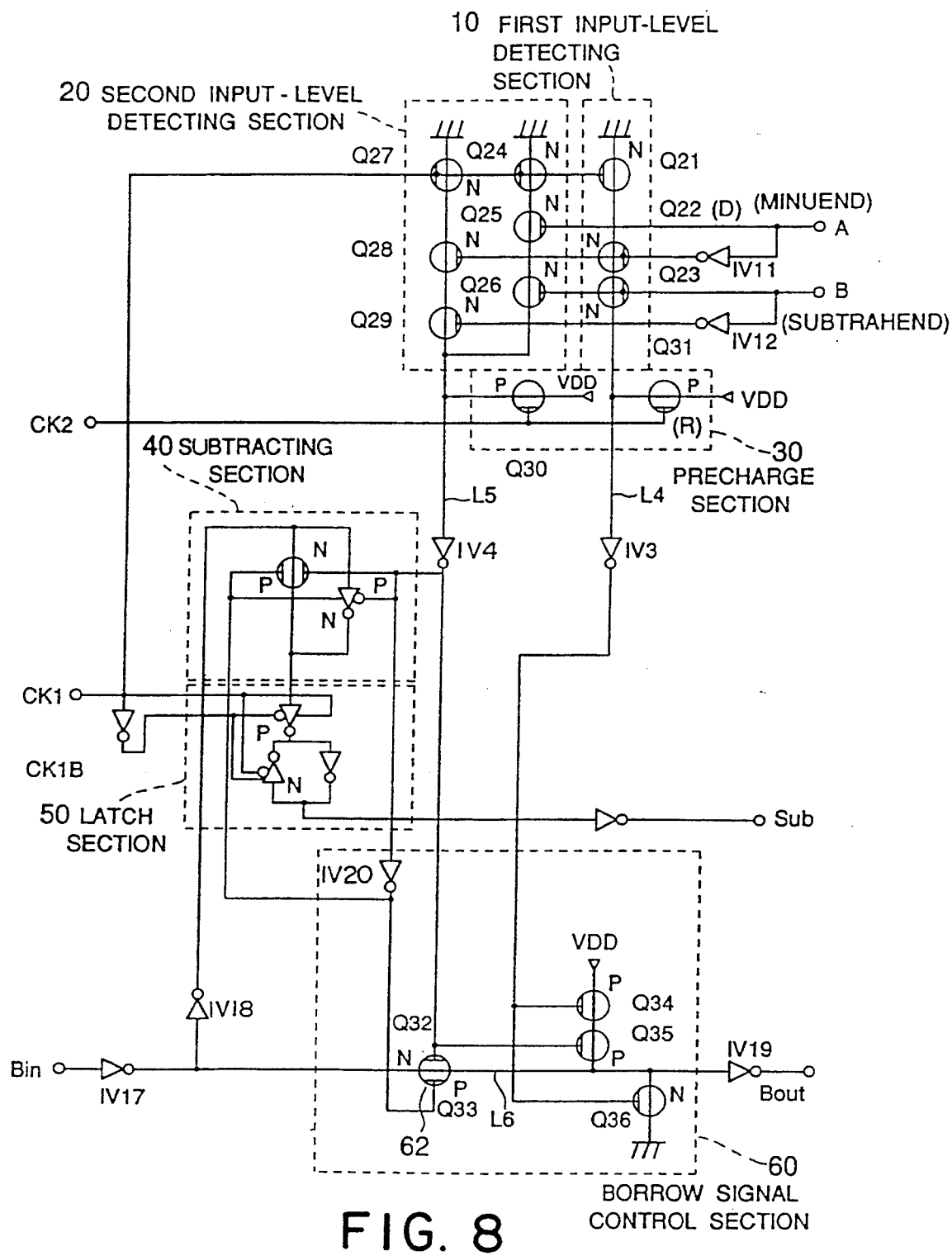
FIG. 8 is a circuit diagram of a subtracter as an arithmetic circuit according to another embodiment of the present invention.

FIG. 8 shows a subtracter as an arithmetic circuit according to a second embodiment of the present invention. The subtracter is also provided with a signal transmission line L6 for transmitting a borrow signal from the subtracter to an adjacent higher order position subtracter.

In general, a subtracter becomes operational when a minuend A, a subtrahend B, and an input borrow-in signal Bin from an adjacent lower order position subtracter are inputted to the subtracter, and outputs a remainder Sub and an output borrow-out signal Bout to an adjacent higher order bit subtracter. The truth table of FIG. 9 lists all of the eight different cases for the different inputs A, B and Bin, among which there are four cases in which a borrow-out Bout is generated. Two of the four cases are listed in Case group (e) including four cases in which A=B, and the borrow-in Bin is transferred, as it is, as the borrow-out signal Bout. The remaining two cases in which borrow-out signal Bout is outputted are listed in Case group (f) in which A=0 and B=1, and a borrow-out signal Bout is generated irrespectively of the input borrow-in Bin.

The configuration of the subtracter of FIG. 8 is the same as that of the adder of FIG. 7 with the exception that each of the configurations of a first and second input-level detecting sections 10 and 20 and a subtracting section 40 of FIG. 8 are different from that of each of the first and the second input-level detecting sections 1 and 2 and the adding section 4 of FIG. 7, respectively, and that a borrow signal control section 60 replaces the carry signal control section 6 of FIG. 7. Hence, the subtracter of FIG. 8 will be described here only about the operation different from that of the adder of FIG. 7.

The first input-level detecting section 10 becomes active level or low level when A=0 and B=1 corresponding to Case-group (f) of FIG. 9, while the second input-level detecting section 20 becomes an active level or low level when both the input A and B are equal to each other corresponding to Case-group (e) of FIG. 9. The subtracting section 40 executes arithmetic operations of A minus B minus Bin (A-B-Bin) for generating a remainder and outputs the remainder as the remainder signal Sub through the latch section 50.

The borrow signal control section 60 operates similarly to the carry signal control section 6 of FIG. 7. The transfer gate 62 of the borrow signal control section 60 is turned on when the input A is equal to the input B, thereby transferring the input borrow-in signal Bin as the output borrow-out signal Bout. The N-ch transistor Q36 is turned on when A=o and B=1, thereby setting the output borrow-out signal to a "1" level.

The subtracter of FIG. 8 outputs a borrow-out signal in a higher speed than a conventional subtracter having a static circuit, since the subtracter of FIG. 8 has a borrow signal control section 60 in which an input borrow-in signal is transferred as an output borrow-out signal. Further, the subtracter of FIG. 8 is less susceptible to noise than a conventional subtracter having a dynamic transmission circuit, since the signal line L6 of FIG. 8 does not hold a data by storing electric charge, but is coupled to the source or the earth during the sampling period.

In the above embodiments, although the signal level of each signal is exemplified as a high level or a low level, the level of the signal can be adopted arbitrarily along with the conductive type of the transistors.

Since the above embodiments are described only as examples, the present invention is not limited to such embodiments and it will be obvious for those skilled in the art that various modifications or alterations can be easily made based on the above embodiments under the scope of the present invention.

What is claimed is:

1. An arithmetic circuit for generating a sum signal and a carry-out signal each of a one-bit binary data, said arithmetic circuit comprising:

an input member for inputting first and second operands and a carry-in signal, each of said first and second operands and said carry-in signal being a one-bit binary data;

a first input-level detecting section, operatively coupled to said input member, for outputting a first active signal during a first period at a first node when both said first and second operands are 1;

a second input-level detecting section, operatively coupled to said input member, for outputting a second active signal during said first period at a second node when said first operand is 1 and said second operand is 0;

a precharge section, operatively coupled to said first and second nodes, for precharging said first and second nodes during a second period occurring alternately with said first period;

adding means, operatively coupled to said first and second input-level detecting sections, for generating a sum of said first operand and said second operand and said carry-in signal, and for outputting said sum as said sum signal; and a carry signal control section, operatively coupled to said first and second input-level detecting sections, having first switching means for setting said carry-out signal at 1 responsive to said first active signal, a transfer gate for transferring said carry-in signal as said carry-out signal responsive to said second active signal, and second switching means, separately from said first switching means, for setting said carry-out signal at 0 responsive to an absence of said first and second active signals during said first period, wherein said second switching means comprises first means turned on responsive to an absence of said first active signal, and second means connected in a series to first means and turned on responsive to an absence of said second active signal.

2. An arithmetic circuit as defined in claim 1 wherein said first means comprises a first transistor and said second means comprises a second transistor.

3. An arithmetic circuit as defined in claim 1 wherein said transfer gate comprises an N-ch transistor and a P-ch transistor connected in parallel to each other and turned on responsive to said second active signal.

4. An arithmetic circuit for generating a remainder signal and a borrow-out signal, comprising:

an input member for inputting a minuend, a subtrahend and a borrow-in signal, each of said minuend, subtrahend and borrow-in signal being a one-bit binary data;

a first input-level detecting section, operatively coupled to said input member, for outputting a first active signal during a first period at a first node when said minuend is 0 and said subtrahend is 1;

a second input-level detecting sections, operatively coupled to said input member, for outputting a second active signal during said first period at a second node when said minuend is equal to said subtrahend;

a precharge section, operatively coupled to said first and second nodes, for precharging said first and second nodes during a second period occurring alternately with said first period;

subtracting means, operatively coupled to said first and second input-level detecting section, for generating a remainder by subtraction of said subtrahend and said borrow-in signal from said minuend and for outputting said remainder as said remainder signal; and a borrow signal control section, operatively coupled to said first and second input-level detecting sections, having first switching means for setting said borrow-out signal at 1 responsive to said first active signal, a transfer gate for transferring said borrow-in signal as said borrow-out signal responsive to said second active signal, and second switching means, separately from said first switching means, for setting said borrow-out signal at 0 responsive to an absence of said first and second active signals during said first period, wherein said second switching means comprises first means turned on responsive to an absence of said first active signal, and second means connected in series to said first means and turned on responsive to an absence of said second active signal.

5. An arithmetic circuit as defined in claim 4 wherein said first means comprises a first transistor and said second means comprises a second transistor.

6. An arithmetic circuit as defined in claim 4 wherein said transfer gate comprises an N-ch transistor and a P-ch transistor connected in parallel to each other and turned on responsive to said second active signal.

7. An arithmetic circuit for generating a sum signal and a carry-out signal each of a one-bit binary data, said arithmetic circuit comprising:

an input member for inputting first and second operands and a carry-in signal;

a first input-level detecting section, operatively coupled to said input member, for outputting a first active signal during a first period at a first node when both said first and second operands are at a first level;

a second input-level detecting section, operatively coupled to said input member, for outputting a second active signal during said first period at a second node when said first operand is at said first level and said second operand is at a second level;

a precharge section, operatively coupled to said first and second nodes, for precharging said first and second nodes during a second period occurring alternately with said first period;

adding means, operatively coupled to said first and second input-level detecting sections, for generating a sum of said first operand and said second operand and said carry-in signal, and for outputting said sum as said sum signal; and a carry signal control section, operatively coupled to said first and second input-level detecting sections, having first switching means for setting said carry-out signal to said first level responsive to said first active signal, a transfer gate for transferring said carry-in signal as said carry-out signal responsive to said second active signal, and second switching means, separately from said first switching means, for setting said carry-out signal to said second level responsive to an absence of said first and second active signals during said first period, wherein said second switching means comprises first means turned on responsive to an absence of said first active signal, and second means connected in series to said first means and turned on responsive to an absence of said second active signal.

8. An arithmetic circuit as defined in claim 7, wherein said first means comprises a first transistor and said second means comprises a second transistor.

9. An arithmetic circuit for generating a remainder signal and a borrow-out signal, comprising:

an input member for inputting a minuend, a subtrahend and a borrow-in signal;

a first input-level detecting section, operatively coupled to said input member, for outputting a first active signal during a first period at a first node when said minuend is at a first level and said subtrahend is at a second level;

a second input-level detecting section, operatively coupled to said input member, for outputting a second active signal during said first period at a second node when said minuend is equal to said subtrahend;

a precharge section, operatively coupled to said first and second nodes, for precharging said first and second nodes during a second period occurring alternately with said first period;

subtracting means, operatively coupled to said first and second input-level detecting sections, for generating a remainder by subtraction of said subtrahend and said borrow-in signal from said minuend, and for outputting said remainder as said remainder signal; and a borrow signal control section, operatively coupled to said first and second input-level detecting sections, having first switching means for setting said borrow-out signal at said second level responsive to said first active signal, a transfer gate for transferring said borrow-in signal as said borrow-out signal responsive to said second active signal, and second switching means, separately from said first switching means, for setting said borrow-out signal at said first level responsive to an absence of said first and second active signals during said first period, wherein said second switching means comprises first means turned on responsive to an absence of said first active signal, and second means connected in series to said first means and turned on responsive to an absence of said second active signal.

10. An arithmetic circuit as defined in claim 9, wherein said first means comprises a first transistor and said second means comprises a second transistor.

* * * * *